United States Patent [19]

Uba

[11] 4,295,029
[45] Oct. 13, 1981

[54] BATTERY STRAP CONNECTION WELDING METHOD

[75] Inventor: Toshio Uba, Denver, Colo.

[73] Assignee: The Gates Rubber Company, Denver, Colo.

[21] Appl. No.: 153,346

[22] Filed: May 27, 1980

Related U.S. Application Data

[62] Division of Ser. No. 43,203, May 29, 1979, Pat. No. 4,241,151.

[51] Int. Cl.³ .................... B23K 9/225; B23K 9/16
[52] U.S. Cl. .................... 219/75; 219/137 R; 228/58
[58] Field of Search ............ 219/137 R, 74, 75, 106; 429/94, 122, 160, 161, 178, 181, 183, 184; 228/58, 185

[56] References Cited

U.S. PATENT DOCUMENTS

| | | | |
|---|---|---|---|
| 1,995,546 | 3/1935 | Meier | 219/137 R X |
| 2,261,109 | 11/1941 | Dunzweiler | 429/160 |
| 2,326,537 | 8/1943 | Hill | 429/161 |
| 2,366,579 | 1/1945 | Von Ahrens | |
| 2,628,992 | 2/1953 | Weidman | 228/58 X |
| 3,704,173 | 11/1972 | McClelland | 429/181 X |
| 3,806,696 | 4/1974 | Young et al. | 219/137 R |
| 3,862,861 | 1/1975 | McClelland et al. | 429/94 X |
| 3,873,803 | 3/1975 | Young et al. | 219/75 X |
| 3,908,743 | 9/1975 | Schenk, Jr. et al. | 228/58 X |
| 4,037,077 | 7/1977 | Harder | 219/75 X |

FOREIGN PATENT DOCUMENTS

| | | | |
|---|---|---|---|
| 573405 | 3/1959 | Canada | 228/189 |
| 1161072 | 8/1958 | France | 228/189 |
| 307574 | 5/1933 | Italy | 228/189 |

*Primary Examiner*—Gene Z. Rubinson
*Assistant Examiner*—Keith E. George
*Attorney, Agent, or Firm*—Curtis H. Castleman, Jr.; Raymond Fink; H. W. Oberg, Jr.

[57] ABSTRACT

A unitary welded connection between a projecting leg of a cell connecting strap and collector tabs emanating from the plates of the cell is disclosed, the leg having boss protrusion(s) to eliminate bridge welds.

4 Claims, 16 Drawing Figures

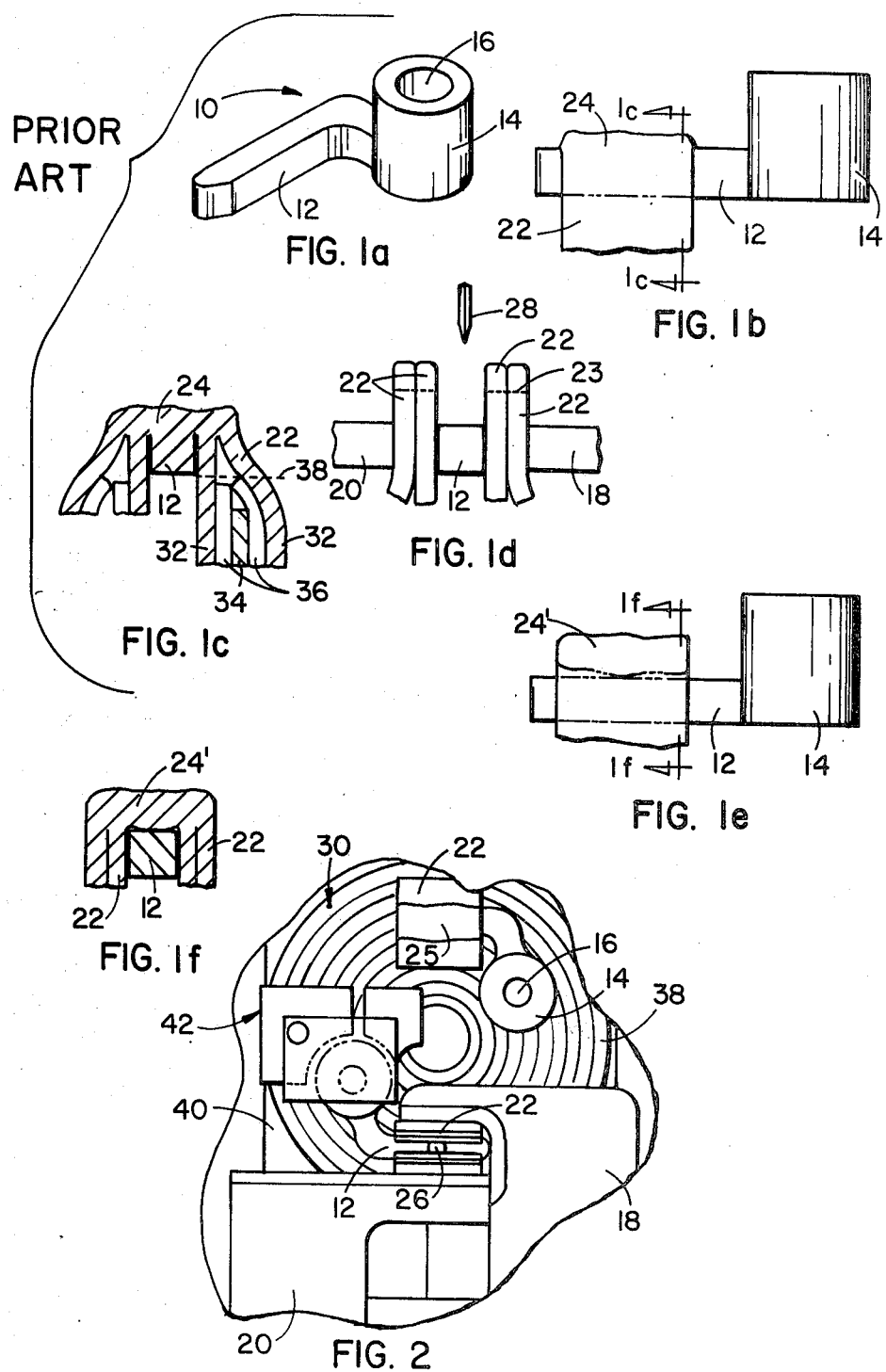

BATTERY STRAP CONNECTION WELDING METHOD

This is a division of application Ser. No. 43,203, filed on May 29, 1979, now U.S. Pat. No. 4,241,151, issued Dec. 23, 1980.

BACKGROUND OF THE INVENTION

This invention relates to electrochemical cells and batteries, especially lead-acid, and particularly to a welded connection between current collector tabs of the plates and battery straps attached to the customary inter cell connectors as well as the posts connected to the output terminals of the cell.

Current collector tabs attached to common polarity electrode plates are customarily joined together by a connecting strap (i.e., a buss bar) connected or integral at one end with a post serving as a terminal or inter cell connector for a battery. The current collector tabs emanating from the plates have traditionally been joined to the battery straps by a burning process with the aid of lead filler rods. Certain high performance batteries requiring a minimum impedance connection may use more sophisticated methods such as disclosed in U.S. Pat. Nos. 3,806,696 to Young et al. and 4,037,077 to Harder. In those patents, a leg portion of the strap is sandwiched between collector tabs and surrounded by an ingot-like mold, provided for instance by tungsten jaws, and then an electrode arc derived from an inert-gas-shielded, non-consumable electrode (e.g., TIG or plasma) is oscillated over the lead parts causing them to melt and fuse together. The high thermal conductivity of the mold jaws act as a heat sink serving to quickly cool and form the weld bead.

Applicant has discovered, especially when employing the method of the Young or Harder patents, that an unacceptably high percentage of the collector tab-to-strap welds possess latent defects. A loss of electrical connection occurs upon subsequent use and/or vibration of the battery due to a condition in which only the collector tabs have been fused together; the fused tabs bridge over the leg of the connecting strap without melting together with the leg as desired. Initial testing shows a good connection solely because of frictional contact between the leg of the strap and tabs. These "bridge welds" increase the internal impedance of the cell, and oftentimes lead to a loss of connection between the output terminals and plates of the battery, producing an open circuit.

It is a primary object of the invention to minimize the chance of forming bridge welds in a current collector tab-to-strap connection in a lead or other electrochemical cell or battery, and to provide a reliable, cheap unitary welded low silhouette connection without appreciably increasing the weight or mass of the strap. It is another object, especially with respect to the manufacture of automotive (SLI) lead batteries to provide a lead strap design eliminating the need for lead filler rods.

SUMMARY OF THE INVENTION

Briefly described, in one aspect the invention is directed to an electrochemical cell comprising a cell pack consisting of opposite polarity electrode plates and separator material interleaved between the plates, a plurality of spaced collector tabs emanating from the plates and upstanding from the edge of the cell pack, and a strap having at least one projecting leg interposed between and welded to adjacent collector tabs associated with a given polarity plate. The improvement specifically comprises providing the leg, having an elongate body portion, with at least one boss protruding therefrom and away from the cell pack edge. At least a portion of the boss is fused together with the adjacent collector tabs to form, with the leg, a unitary low impedance welded connection.

The invention also pertains to such electrochemical cell in which the aforementioned welded connection is produced by the steps of (1) positioning the leg between adjacent collector tabs so that the boss is sandwiched in close proximity to the adjacent collector tabs; (2) juxtaposing mold means having a high thermal conductivity against the sides of the collector tabs; and (3) passing an electrode arc over the current tabs/leg and included boss ("weldable surface") to cause upwardly extending portions of the collector tabs, together with at least a portion of the boss, to melt and flow together into a fused mass, the flow being contained by the mold means.

The invention is also drawn to the strap with leg modified according to the subject invention.

BRIEF DESCRIPTION OF THE DRAWINGS

The invention in its preferred embodiments will be more particularly described with reference to the accompanying drawings, wherein like numerals refer to like parts, and in which:

FIG. 1a is a perspective view of a prior art strap integral with a terminal post;

FIG. 1b is a side elevational view of the strap of FIG. 1a welded to adjacent current collector tabs;

FIG. 1c is a partial sectional view taken along section 1c—1c of FIG. 1b;

FIG. 1d is a view similar to FIG. 1c but prior to the welding operation;

FIG. 1e is a side elevational view similar to FIG. 1b, illustrating a bridge weld (not in accordance with the invention);

FIG. 1f is a sectional view taken along section 1f—1f of FIG. 1e;

FIG. 2 is a plan view of a spirally wound electrochemical element and a part of the apparatus for carrying out the welding operation;

FIG. 5b is a view taken along line 5b—5b of FIG. 5a;

FIG. 6b is a sectional view of the weld taken along 6b—6b of FIG. 6a;

PREFERRED EMBODIMENTS OF THE INVENTION

Referring first to illustrations representing the prior art in FIGS. 1a–1d, there is shown a lead connector strap body generally at 10 comprising a leg extension 12, with the strap terminating at the opposite end in an integral post 14. The post (barrel) 14 includes a central cavity 16 to receive an expansion member terminal connector such as a blind rivet or self-tapping screw as shown in U.S. Pat. No. 3,704,173 to McClelland et al., or other type of embedded connector.

Figure 7:
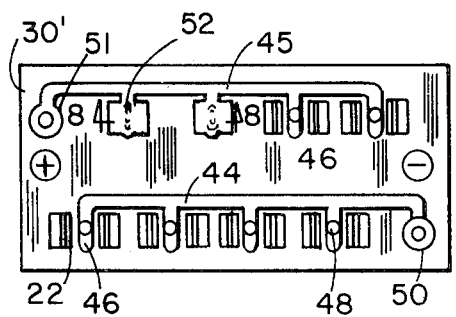
FIG. 7 is a top plan view of a parallel plate battery and interconnecting straps in accordance with the invention.

Connection is made between the lead strap 10 through its leg 12 shown in FIG. 1a and tab extensions 22 of the electrode plates of the electrochemical cell, as shown particularly in FIGS. 1b–1d and FIG. 2. A spirally wound cell pack element 30, (which may alternatively be of prismatic parallel plate form as shown in FIG. 7, or other configuration) consists essentially of a continuous positive polarity plate 32, a continuous negative polarity electrode plate 34, and interleaved separator material 36 (shown unsectioned). A given polarity plate such as positive plate 32 is provided with a plurality of adjacently spaced, aligned current collector tabs 22, which upstand from the top edge surface 38 of the cell pack.

To weld the strap leg 12 to the common positive polarity tabs 22, the general method of U.S. Pat. Nos. 3,806,696 and 4,037,077, mentioned above, and hereby incorporated by reference, is preferred. Briefly, the welding apparatus or station includes a fixture 40 which holds the spirally wound work piece element 30, a locator mechanism 42 for immobilizing the post barrel 14 in its proper location during weld, a pair of retractable mold jaws 18, 20 for straddling the work piece weldable surface and serving as counter electrodes, and an electrode 28 for supplying an electrode arc preferably derived from an inert-gas-shielded, non-consumable electrode, e.g., a TIG (tungsten-inert-gas) or plasma system.

In operation of the method, leg 12 is positioned between the upstanding collector tabs 22 as shown best in FIG. 1d. With the post barrel 14 securely positioned within the locating mechanism 42, jaws 18 and 20 are brought toward one another so that they press against the sides of the tabs 22, to form an ingot-like mold substantially surrounding the weldable surface. The electrode arc is then struck and preferably passed over the weldable surface in an oscillatory manner, longitudinally of the leg, for greater than one full pass to cause the upper portion of the collector tabs 22 and the upper surface of leg 12 to melt and fuse together, the flow of the melt being contained by the mold jaws 18, 20. Such mold jaws have a very high thermal conductivity (preferably formed of tungsten or an alloy thereof) so that the flow is cooled rapidly inwardly. After the weld bead is formed, the jaws are retracted away from the work piece, and the fixture 40 may be rotated to enable performance of the same operation for the opposite polarity collector tabs and strap or indexed to a similar station for welding of the opposite tab. The resultant weld with a generally uniform unitary weld bead 24 is shown in FIGS. 1b and 1c.

The foregoing method is effective as long as the collector tabs 22 protrude above the cell pack edge 38 within a predetermined tolerance of the desired protruding level, shown at 23. However, Applicant has found particularly with spirally wound cells that the height which the collector tabs 22 protrude above the cell pack edge varies considerably during the course of normal manufacturing operations. Applicant has found that when the collector tabs 22 protrude even as little as 0.060 inches above the desired level 23, the resulting welding operation may lead to a bridge weld condition as shown in FIGS. 1e and 1f, in which the upper portion of the collector tabs forms the weld bead 24' which bridges over and makes only frictional or minimal contact with the upper surface and/or sides of leg 12. There is no fusing of the elements together through co-melting as required for a satisfactory electrical connection. The bridge weld condition is oftentimes not readily evident from inspecting the finished weld bead, without dissecting the connection. Inspection even may reveal a satisfactory electrical connection due to frictional contact, but this connection may be lost after handling and shipping.

In accordance with the invention, the bridge weld condition is overcome, while only minimally increasing the mass and silhouette of the strap, by providing at least one boss 26, 27, attached to the top surface of leg 12 (so that it protrudes away from the cell pack edge 38). The boss 26 is located generally medially along the leg such that it is positioned at about the half-way point longitudinally with respect to the adjacent collector tabs 22 during the welding operation as previously described. The boss preferably protrudes from the body of the leg 12 a height from about 20 to about 75 and more preferably from about 25 to about 45 percent of the ideal i.e., (design) tab height "h". The ideal tab height would be dependent upon the welder used, the cross sectional configuration of the leg plus the mass of lead in both the leg and the tabs and would therefore vary with each application. It has been found that even a relatively small protrusion is usually sufficient to form a unitary welded connection between the tabs 22, and elongate body portion of the leg 12 in the situation shown in FIG. 5a where the collector tabs 22 are protruding well above the design height "h". Based on the thickness "t" of the leg 12 of the strap, the boss generally protrudes preferably a height from about 20 to about 85 and more preferably from about 35 to about 65 percent of the leg thickness "t".

Figure 6A:
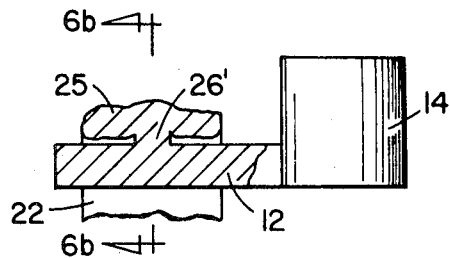
FIG. 6a is a side elevational, part sectional view of a unitary welded connection in accordance with the invention.
Figure 6B:
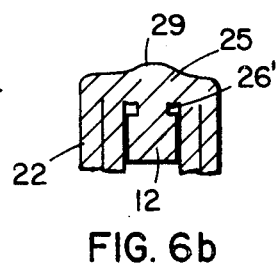

As shown in FIGS. 6a and 6b, at least a portion of the upper surface of boss 26 (denoted 26' after welding) has melted during the welding operation and has fused into a unitary connection with the immediately adjacent portion of the collector tabs 22, to form weld bead 25.

Figure 3:
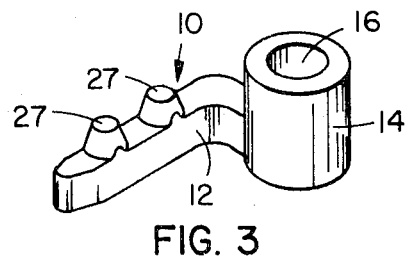
FIG. 3 illustrates in perspective a strap and post configured according to the invention.

The boss 26 or a plurality of bosses such as shown at 27 in FIG. 3, may take on any desired protruding shape, such as solid cylindrical and truncated conical as shown, or oval, hollow cylindrical, hemispherical, pyramidal or the like.

Figure 5B:
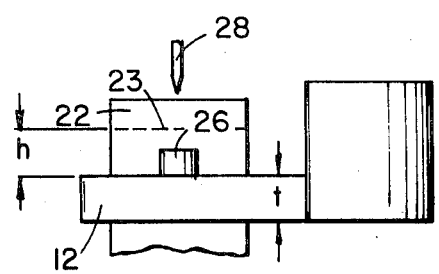
Figure 5A:
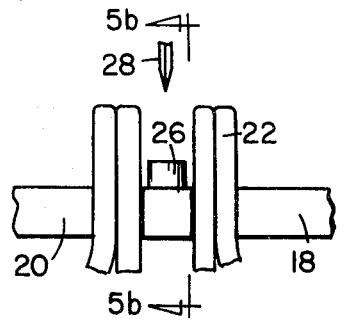
FIG. 5a is a view similar to FIG. 1d, but utilizing the strap of the invention.
Figure 6C:
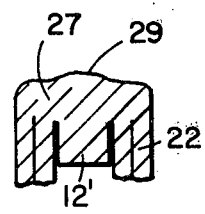
FIG. 6c is a sectional view similar to 6b, showing an alternative configuration.

In the event that the collector tabs protrude from the cell pack edge the normal amount, as at approximate level 23 of FIGS. 1d and 5b, then the welding operation (as previously described) may well completely melt boss 26 so that it becomes fused with and inseparable from the collector tabs and upper portion of leg 12', as shown in FIG. 6c. In this situation, weld bead 27 may still evidence a small hump 29 corresponding to the added lead mass of the boss 26, also often evidenced when the tabs are over height as in FIG. 6b. However, the hump would normally only be visible in cases where the electrode is moved evenly over the entire width of the tabs. In cases where the electrode is stationary or oscillates over the boss no hump would be visible normally.

Figure 4:
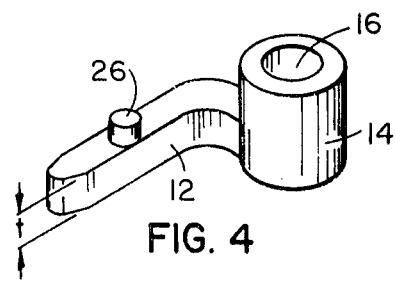
FIG. 4 shows an alternative strap and post according to the invention.
Figure 8:
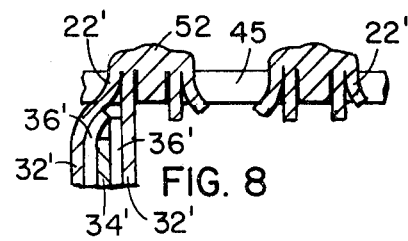
FIG. 8 is a view along line 8—8 of FIG. 7.

In the embodiments of FIGS. 7 and 8, a slightly modified version of the invention is shown. The cell element consists of positive plates 32', negative plates 34' and interposed separator 36' arranged in flat plate parallel fashion, in the direction indicated by the shading of FIG. 7. A pair of elongated strap body members 44, 45 (buss bars) are provided having a plurality of legs 46 projecting from the strap body in comb-like fashion. Each of the individual legs 46 in turn carries a protuberant boss 48 thereon, in the same fashion of FIG. 4. Strap members 44, 45 terminate in post members 50, 51 which can either serve as the receptcle for output terminals, or serve as or be modified as an inter cell connection between cells of a battery (not shown). The resultant weld produces beads 52 having a cross section as shown in FIGS. 6b or 6c (only the latter is shown).

The use of boss 26, or bosses 27, can be made applicable to SLI or other batteries using multiple positive and negative plates in each cell, of the type of FIG. 7, for instance. This would avoid bridge welds during an automatic welding operation and would also avoid repeated passes with a torch on a manual tab-to-inter cell strap or tab-to-post welding operation.

While only the cell pack element of plates and separators, and welded straps are illustrated, it is understood that the wound or parallel plate element shown is intended to be encapsulated in an electrolyte resistant and leak proof container and top, and terminal connections made from the posts and externally of the battery. In this regard, McClelland et al. U.S. Pat. Nos. 3,862,861 and 3,704,173 are instructive, and hereby incorporated by reference.

While certain representative embodiments and details have been shown for the purpose of illustrating the invention, it will be apparent to those skilled in the art that various changes and modifications may be made therein without departing from the spirit or scope of the invention. For instance, the collector tabs may protrude at different relative heights prior to welding, rather than evenly as shown.

What is claimed is:

1. A method for forming a unitary welded connection between collector tabs of electrode plates and a strap having at least one projecting leg, in a lead electrochemical cell, normally subject to variations in collector tab height relative to the leg contributing to the problem of forming an unsatisfactorily high percentage of "bridge welds", comprising the steps of:

positioning the leg between a plurality of adjacent collector tabs having a thin cross section relative to the leg, and the tabs extending upwardly above the leg and a boss being provided on the upper surface of the leg, whereby the boss is sandwiched in close proximity to the adjacent upwardly extending collector tabs;

juxtaposing mold means having a high thermal conductivity against the sides of the collector tabs; and supplying an electrode arc employing an inert-gas-shielded, non-consumable electrode to the weldable surface (comprising collector tabs, leg and included boss) to cause upwardly extending portions of the collector tabs, and at least a portion of the boss, to melt and flow together into a fused mass without the use of lead filler rods, the flow being contained by the mold means.

2. A method of forming a welded intracell connection between collector tabs emanating from electrode plates with legs of a lead strap in a spirally wound electrochemical cell, subject to variable collector tab heights relative to the cell pack upon winding, and to the formation of unacceptable bridge welds when the collector tabs protrude above specification height, comprising the steps of:

(a) providing the leg of the strap with a boss protruding above the leg a height of from about 20 to about 75 percent of the ideal (design) height of the collector tabs above the leg when positioned in accordance with step "(b)";

(b) positioning the leg between adjacent collector tabs upwardly extending substantially above the boss and leg so that the boss is sandwiched in close proximity to the adjacent upwardly extending collector tabs;

(c) juxtaposing mold means having a high thermal conductivity against the sides of the collector tabs; and (d) supplying an electrode arc of an inert-gas-shielded, non-consumable electrode to the weldable surface (comprising collector tabs, leg and included boss) to cause upwardly extending portions of the collector tabs, and at least a portion of the boss, to melt and flow together into a fused mass without the use of lead filler rods, the flow being contained by the mold means.

3. The method of claim 2 wherein prior to supplying the electrode arc to the weldable surface the collector tabs are brought into direct contact with the leg on either side thereof.

4. The method of claim 3 wherein the boss has a shape selected from solid or hollow cylindrical, truncated conical, oval, hemispherical, and pyramidal.

* * * * *